United States Patent
Xiong et al.

(10) Patent No.: US 10,477,620 B2
(45) Date of Patent: Nov. 12, 2019

(54) MACHINE TYPE COMMUNICATION RELAYING

(71) Applicant: INTEL IP CORPORATION, Santa Clara, CA (US)

(72) Inventors: Gang Xiong, Beaverton, OR (US); Debdeep Chatterjee, Mountain View, CA (US); Alexey Khoryaev, Nizhny Novgorod (RU); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/745,572

(22) PCT Filed: Dec. 23, 2015

(86) PCT No.: PCT/US2015/000451
§ 371 (c)(1),
(2) Date: Jan. 17, 2018

(87) PCT Pub. No.: WO2017/030520
PCT Pub. Date: Feb. 23, 2017

(65) Prior Publication Data
US 2018/0213379 A1     Jul. 26, 2018

Related U.S. Application Data

(60) Provisional application No. 62/207,759, filed on Aug. 20, 2015.

(51) Int. Cl.
*H04W 88/04*     (2009.01)
*H04W 4/70*     (2018.01)
(Continued)

(52) U.S. Cl.
CPC .............. *H04W 88/04* (2013.01); *H04B 7/14* (2013.01); *H04L 5/0055* (2013.01); *H04W 4/70* (2018.02); *H04W 24/10* (2013.01); *H04W 40/22* (2013.01)

(58) Field of Classification Search
CPC ... H04W 40/22; H04W 452/46; H04W 88/04; H04W 76/14; H04W 76/23
See application file for complete search history.

(56) References Cited

U.S. PATENT DOCUMENTS

2011/0013552 A1*   1/2011   Ali ..................... H04B 7/15521
                                                          370/315
2012/0307764 A1*   12/2012   Zhao ..................... H04W 28/24
                                                          370/329

(Continued)

FOREIGN PATENT DOCUMENTS

EP           2941038 A1     11/2015
WO    20140104627 A1     7/2014

OTHER PUBLICATIONS

International Search Report and Written Opinion for International Patent Application No. PCT/US2015/000451 dated May 19, 2016; 10 pages.

*Primary Examiner* — Ashley Shivers
(74) *Attorney, Agent, or Firm* — Schwabe, Williamson & Wyatt, P.C.

(57) ABSTRACT

An electronic device for use in a machine type communication (MTC) relay device includes circuitry having: a receive signal path to receive data from at least one MTC device; and a transmit signal path to forward processed data, based on the data, to an evolved NodeB (eNB), wherein at least one of: (a) the data is received via Device-to-Device (D2D) sidelink; (b) the MTC relay device is a relay node and the data is received via a relaying link; or (c) the MTC relay device is a multi-radio access technology (multi-RAT)

(Continued)

capable small cell device and the data is received via WiFi, Bluetooth, Long-Term Evolution-Unlicensed (LTE-Unlicensed), or mmWave communication.

18 Claims, 8 Drawing Sheets

(51) Int. Cl.
  *H04W 40/22* (2009.01)
  *H04B 7/14* (2006.01)
  *H04L 5/00* (2006.01)
  *H04W 24/10* (2009.01)

(56) References Cited

U.S. PATENT DOCUMENTS

| | | | |
|---|---|---|---|
| 2013/0130628 A1* | 5/2013 | Takano | H04W 24/10 455/67.11 |
| 2014/0171062 A1 | 6/2014 | Fallgren et al. | |
| 2016/0142974 A1* | 5/2016 | Lindoff | H04W 56/00 370/311 |
| 2016/0192439 A1* | 6/2016 | Phuyal | H04W 88/04 370/315 |
| 2016/0338094 A1* | 11/2016 | Faurie | H04W 72/085 |

* cited by examiner

MACHINE TYPE COMMUNICATION RELAYING

CROSS REFERENCE TO RELATED APPLICATIONS

The present application is a national phase entry under 35 U.S.C. § 371 of International Application No. PCT/US2015/000451, filed Dec. 23, 2015, entitled "MACHINE TYPE COMMUNICATION RELAYING", which claims priority from U.S. Provisional Patent Application No. 62/207,759, filed Aug. 20, 2015, and entitled "DEVICE-TO-DEVICE (D2D) ASSISTED MACHINE TYPE COMMUNICATION (MTC)", the entire disclosures of which are hereby incorporated by reference in their entireties.

TECHNICAL FIELD

Embodiments relate to the field of wireless communications.

BACKGROUND

The development of the so-called Internet of Things (IoT) will place new demands on wireless communication networks. Modification of wireless networking systems may assist is meeting these new demands.

BRIEF DESCRIPTION OF THE DRAWINGS

Embodiments described herein are illustrated, without limitation, by way of example, in the accompanying drawings.

DESCRIPTION OF EMBODIMENTS

Figure 1:
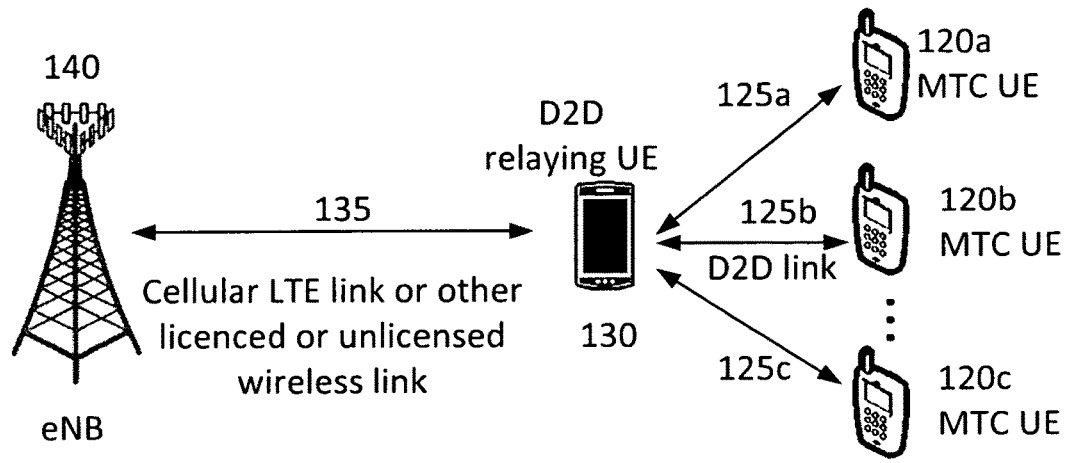
FIG. 1 illustrates an architecture for Device-to-Device (D2D) assisted MTC.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of embodiments. However, it will be apparent to those skilled in the art having the benefit of the present disclosure that the various embodiments claimed may be practiced in other examples that depart from these specific details. In certain instances, descriptions of well-known devices, circuits, and methods are omitted so as not to obscure the description of the embodiments with unnecessary detail.

Embodiments may be related to RAN1 and 5G, for example.

Introduction

Machine-Type Communication (MTC) is a promising and emerging technology to enable a ubiquitous computing environment towards the concept of "Internet of Things (IoT)". Potential MTC based applications include smart metering, healthcare monitoring, remote security surveillance, intelligent transportation system, etc. These services and applications stimulate the design and development of a new type of MTC device that needs to be seamlessly integrated into legacy and next generation mobile broadband networks such as Long-Term Evolution (LTE), LTE-Advanced and 5G technologies.

The legacy mobile broadband networks were designed to optimize performance mainly for human-type communications and thus are not designed or optimized to meet MTC related requirements. MTC specific designs are currently being studied by 3GPP Radio Access Network (RAN) working groups (WGs) for specification support in Release-13 LTE specifications, wherein the primary objective is to focus on lower device cost, enhanced coverage and reduced power consumption.

In general, it is envisioned that a large number of MTC devices will be deployed for specific services within one cell in the near future. When such a massive number of MTC devices attempt to access and communicate with the network, a substantial amount of resources on control signalling are expected. Taking into account the limited data exchange between MTC devices and the network, this would significantly reduce the system spectrum efficiency.

To address this issue and support a massive number of MTC devices in the network, embodiments may be configured to support the MTC with assistance of D2D, relaying, and/or multi-RAT capable small cell. Specifically, D2D devices, relaying nodes and multi-RAT (radio access technology) capable small cell would serve as the gateway(s) to collect data or measurement report from MTC devices and process the information. Subsequently, D2D devices, relaying nodes and multi-RAT capable small cell would forward this information to the eNodeB. By offloading MTC traffic from the eNodeB, this mechanism would save the control overhead and thereby improve the system spectral efficiency substantially, especially when considering the support of a large number of MTC devices in the network. In addition, this mechanism can help to improve the link budget for MTC devices due to the fact that the offloading D2D devices, relay nodes or multi-RAT capable small cell have better link budget than the serving eNodeB. The relay device (D2D device, relay node or multi-RAT capable small cell) may operate as a fusion center.

The following describes, inter alia:
- Architecture and high level procedure for MTC transmission with assistance of D2D, relaying, and/or multi-RAT capable small cell;
- Two options for the detailed procedure for D2D assisted MTC communication;
- Periodic MTC resource pool and resource allocation within resource pool.

In some examples, the D2D device, relay node or multi-RAT capable small cell performs processing on the data or measurement report received from the MTC devices. For example, the D2D device, relay node or multi-RAT capable small cell may aggregate the data or measurement reports.

The processing may include performing some manipulation of the information represented by the data or measurement report. For example, if MTC devices report temperature measurements, the MTC relay device (e.g. D2D device) may collect temperature measurements from one or more MTC devices and calculate an average temperature. The average temperature may be reported to the eNB. Accordingly, the information provided to the eNB may differ from the information contained in the data/measurement reports from the MTC devices. The processing may include, for example, applying statistical functions (such as a mean, median, mode, standard deviation, etc. calculation), selecting/discarding data, applying functions or algorithms to the information, etc.

Architecture and High Level Procedure for D2D Assisted MTC

FIG. 1 illustrates an architecture example for D2D assisted MTC. In particular, MTC devices 120a-c (which may be referred to herein as MTC UEs) communicate with D2D relaying devices 130 (also referred to herein as D2D relaying UEs or D2D UEs) via sidelinks 125a-c and D2D UE communicates with eNodeB 140 via cellular LTE links 135 or other licensed and unlicensed wireless links 135 (e.g. WiFi, millimeter Wave (mmWave)).

Figure 2:
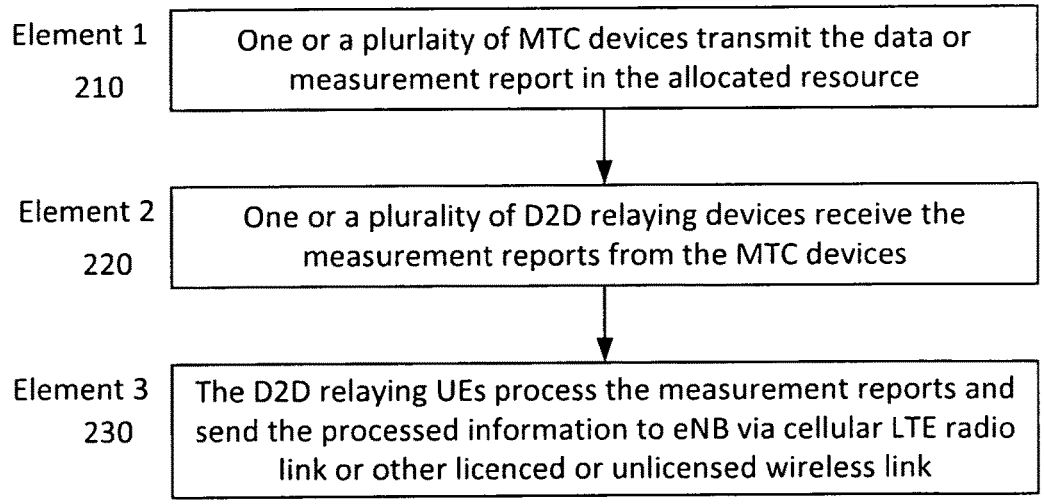
FIG. 2 illustrates a high level procedure for D2D assisted MTC.

As shown in the FIG. 2, the high-level procedure for D2D assisted MTC may include the following elements:
- Element 1 210: One or a plurality of MTC devices 120a-c transmit the data or measurement report in the allocated resource via sidelink 125a-c.
- Element 2 220: One or a plurality of D2D relaying devices 130 receive the measurement reports from the MTC devices 120a-c.
- Element 3 230: The D2D relaying UEs process the measurement reports and send the processed information to the eNodeB 140 via cellular LTE radio link 135 or other licensed and unlicensed wireless link 135.

Note that similar design principles can be easily extended to a group of D2D devices 130 that can be configured to assist the MTC transmission. In this case, multiple D2D devices 130 would receive the data from MTC devices 120a-c, process the information and then forward the data to the eNodeB 140.

Further, in the case when MTC devices 120a-c are located outside network coverage, two hop communication can be considered to forward the local measurement to the eNodeB 140. More specifically, D2D devices 130 outside network coverage would collect the data or measurement report from MTC devices 120a-c via sidelinks 125a-c; subsequently, D2D devices 130 outside network coverage would forward the processed data to the D2D devices 130 within network coverage. In the last element, D2D devices 130 within network coverage would send the data to the eNodeB 140 via cellular LTE radio link 135 or other licensed and unlicensed wireless link 135.

For D2D assisted MTC application, D2D UEs may serve as a fusion center to relay the data or measurement report from multiple MTC devices 10a-c to the eNodeB 140. In some examples, before a group of MTC devices 120a-c initiate the data transmission within MTC resource pool, they are to be associated with certain D2D capable UEs 130. In general, the association rule can be predetermined or semi-static, e.g. depending on the business model.

In one embodiment, initially, D2D UEs manually input the ID of these MTC devices in a database storing associations between a D2D UE and MTC devices. The ID can be in the form of MAC address or IMSI of the MTC devices, for example, which should be available at the D2D UEs.

In another embodiment, D2D UEs trigger the MTC devices to report their IDs in the MTC resource pool. The triggering message can be transmitted in the Physical sidelink Control Channel (PSCCH) or Physical sidelink Discovery Channel (PSDCH) and subsequently, MTC devices report their IDs in the Physical sidelink Shared Channel (PSSCH). The D2D UE may then use the reported IDs to generate the database.

Note that for above options, after D2D UE collects all the information, e.g., capability and UE ID of these MTC devices, may report this information to the eNodeB via cellular link using PUSCH (or some other licensed or unlicensed link).

Figures 3, 4:
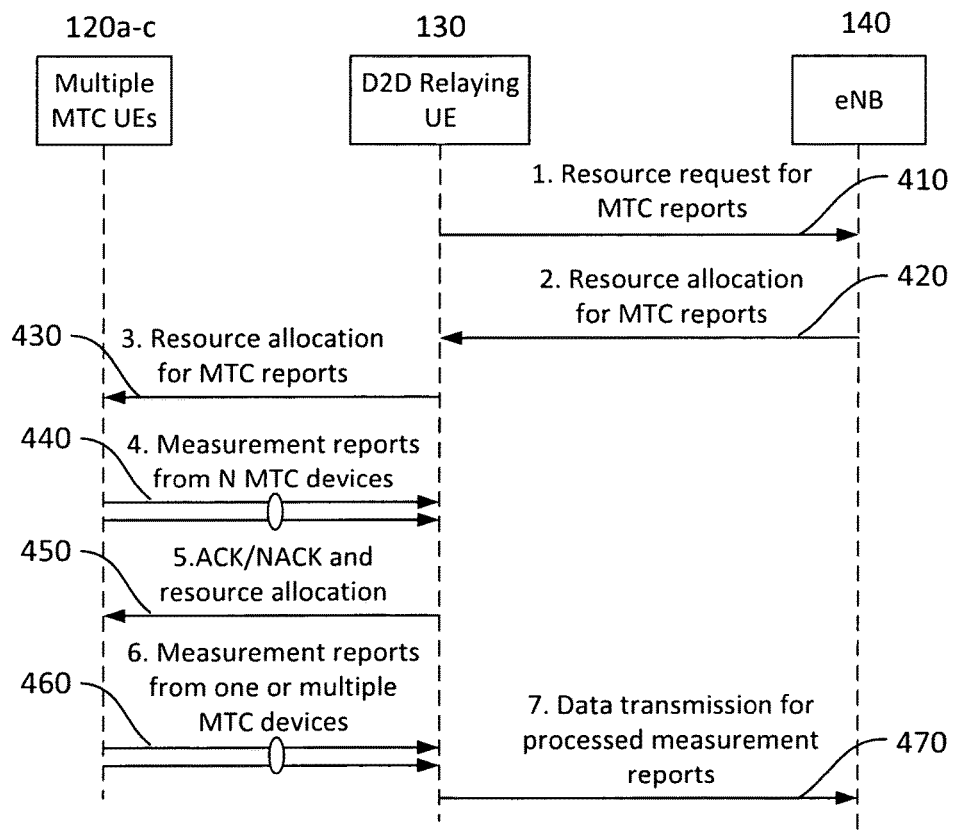
FIG. 3 illustrates a data format for MTC UE information.
FIG. 4 illustrates a detailed procedure for D2D assisted MTC.

An example data format for the transmission of MTC UE information is illustrated in FIG. 3.

The data format for transmitting the MTC UE information may include an identification of a first MTC device (device 0) 310a and an indication of a capability 320a of the first MTC device. Similar indications of device ID 310b-c and capability 230b-c of other MTC devices may be similarly provided. As shown in FIG. 3, device ID for a particular device may be followed in the data format by the capability of the device.

Depending on whether eNodeB 140 allocates the resource for the transmission/retransmission of MTC reports only once or multiple times, the following provides two exemplary options for the detailed procedure for the D2D assisted MTC.

Detailed Procedure for D2D Assisted MTC: Option 1

For the first option, the MTC UEs 120a-c may only need to support a simplified protocol stack that can be developed to only communicate with D2D UEs, and all operations occur on the UL subframes/carriers from the network perspective. This would be the design wherein the maximal benefits of capillary networks can be realized, e.g., wherein the group of MTC devices form a Wireless Body Area Network (WBAN). In an extreme case, MTC device may work only for reception from the eNodeB side in order to acquire synchronization reference and receive common configuration information from the network providing information on sidelink resources for discovery and communication. This approach may be especially attractive for time division duplex (TDD) spectrum where cellular DL and UL resources are on different time instances. Alternatively, MTC devices may fully rely on access and connection to Relay UEs that can periodically broadcast configuration of resources towards MTC devices, which, for example, do not support Uu interface but only have PC5 air-interface.

Alternatively, in some examples the MTC UEs may perform initial access from eNodeB, e.g., acquiring downlink synchronization timing and receiving master information block (MIB) and system information block (SIB). For this type of MTC UEs, additional RF chain may be provided in the case of frequency division duplex (FDD) spectrum, which may increase the UE complexity and cost.

FIG. 4 illustrates the first option of the detailed procedure for D2D assisted MTC according to some embodiments. In particular, In element 1, D2D relaying UE 130 requests 410 (e.g. from eNB 140) the resource in sidelink for the transmission of MTC reports. The resource request 410 may carry information regarding the number of MTC devices and buffer status report (BSR) for each MTC report. It may also contain the capability of each MTC device. The request 410 may be via a cellular link or other licensed or unlicensed wireless link, for example.

In element 2, upon successful reception of the resource 410 from the D2D relaying UE 130, eNodeB 140 sends out the resource allocation 420 for the transmission of MTC reports over sidelinks . . . . The resource allocation 420 may be sent via a cellular link or other licensed or unlicensed wireless link, for example. For this option, D2D relaying UE 130 transmits the measurement reports to eNodeB 140 after successfully collecting the reports 440, 460 from all MTC UEs 120a-c (or a subset of the MTC UEs 120a-c associated with the relaying UE 130). Note that eNodeB 140 may indicate the logical periodic D2D resource pool for the transmission and retransmission of MTC report. This logical periodic resource pool may be mapped to the periodic instances of physical channel (PSCCH/PSSCH). Further, the resource allocation 420 may contain the maximum number of retransmissions allowed for each MTC report.

In element 3, D2D relaying UE 130 sends out the sidelink transmission grant 430 for MTC reports. This transmission grant 430 may contain the detailed resource allocation and MCS for each MTC measurement report, including but not limited to time and frequency allocation for MTC UE transmission (e.g. T-RPT pattern index ($I_{TRP}$), assignment of frequency resources and potentially PSCCH resource index ($n_{PSCCH}$) in case Relay UE 130 is to control the exact transmission timing of the MTC UEs 120a-c.) This information may help to avoid transmission and reception conflicts if Relay UE 130 operates with multiple MTC devices 120a-c and eNodeB 140 simultaneously. To minimize the signaling control overhead, the order of resource allocation and the modulation and coding scheme (MCS) for different MTC UEs can be signaled via PSSCH using MAC or RRC signalling prior to the resource allocation for MTC transmission. The uplink transmission grant can be transmitted via PSCCH with certain modification.

In element 4, all MTC UEs 120a-c report 440 the measurement on the corresponding resource within the resource pool indicated in the uplink grant 430 in the element 3. To minimize the specification effort, the measurement report 440 can be transmitted via PSSCH or separate sidelink physical channel can be designed, for example.

In element 5, D2D relaying UEs 130 receive and attempt to decode the measurement reports from multiple MTC UEs 120a-c. Subsequently, D2D relaying UEs 130 feedback the acknowledgment/negative-acknowledgement (ACK/NACK) information 450 and resource allocation and MCS for the retransmission of the MTC report if they are not successfully decoded. For instance, if D2D relaying UEs 130 successfully decode the report from MTC UE #1 120a, but fail the decoding for MTC UE #2 120b, They may feedback the ACK to UE #1 120a and NACK to MTC UE #2 120b, and the resource allocation and MCS for the retransmission of the measurement report from MTC UE #2 120b.

In element 6, MTC UEs that receive the NACK feedback retransmit the measurement report 460 to the D2D relaying UEs 130 using the MCS and on the resource which is indicated in the uplink grant 450 in element 5.

In element 7, when D2D relaying UE 130 successfully receives the measurement report 460 from all the MTC UEs 120a-c, it performs the post processing and sends out the processed measurement report 470 to the eNodeB 140 via PUSCH.

Detailed Procedure for D2D Assisted MTC: Option 2

For this option, the MTC UEs 120a-c also communicate with (at least receive from) the eNodeB 140 and at least transmit to the D2D UE 130. This can support a simpler MTE UE 120a-c implementation of not having to receive on the UL. The DL receptions would include reception of all control information and mobile-terminated data traffic transmitted by the eNodeB 140. This can be even more appropriate when the MTC relay device 130 ("fusion center/relay") is a small-cell or dedicated relay.

Figure 5:
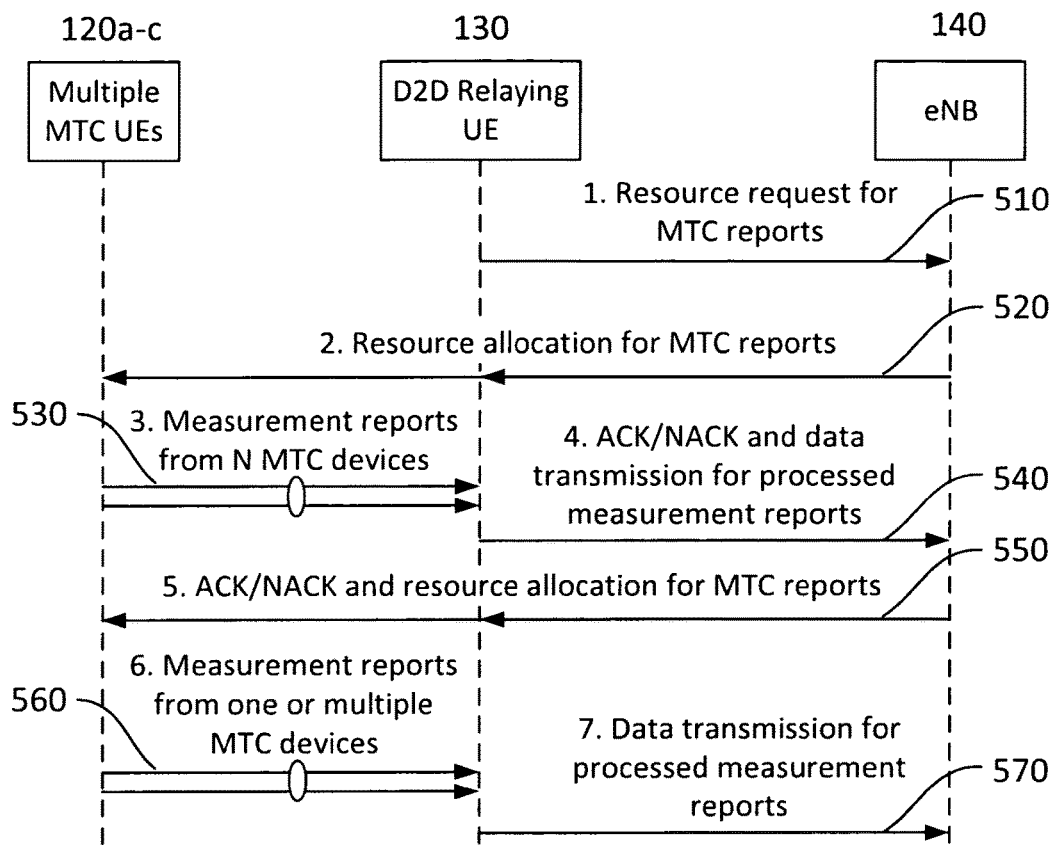
FIG. 5 illustrates a detailed procedure for D2D assisted MTC.

FIG. 5 illustrates the second option of the detailed procedure for D2D assisted MTC.

In element 1, D2D relaying UE 130 requests 510 the resource in sidelink for the transmission of MTC reports. The resource request 510 may carry the information regarding the number of MTC devices 120a-c and buffer status report (BSR) for each MTC report. It may also contain the capability of each MTC device 120a-c. The request 510 may be via a cellular link or other licensed or unlicensed wireless link, for example.

In element 2, eNodeB 140 sends out the resource allocation 530 for the transmission of MTC reports over sidelinks. The resource allocation 530 may be sent via a cellular link or other licensed or unlicensed wireless link, for example. According to this option, both D2D relaying UEs 130 and all MTC UEs 120a-c may listen to the resource allocation from eNodeB 140. This may assist proper reception of the measurement reports from the MTC devices 120a-c. To simplify the design, an example design option of DCI format 3/3A like PDCCH scrambled by MTC-C-RNTI can be used to support the MTC group based signaling. Here MTC-C-RNTI can be predefined in the specification or configured by higher layers via MIB, SIB or dedicated RRC signalling. As mentioned above, D2D relay devices 130 may also decode the PDCCH in order to assist proper reception of the measurement reports from the MTC devices 120a-c.

In element 3, all MTC UEs report 530 the measurement on the corresponding resource within resource pool which is indicated in the resource allocation 520 from eNodeB 140 in the element 2. To minimize or reduce the specification effort, the measurement report 520 can be transmitted via PSSCH.

In element 4, D2D relaying UEs 130 attempt to decode the measurement report 530 from all MTC UEs 120a-c. Subsequently, D2D relaying UEs 130 feedback ACK/NACK information 540 and processed measurement reports to eNodeB 140 for the successfully decoded measurement reports. The combined information can be transmitted via PUSCH.

In element 5, eNodeB 140 feedbacks the ACK/NACK information 550 and resource allocation and MCS for the retransmission 560 of MTC reports that have not been decoded successfully. Similar to element 2, both D2D relaying UEs 130 and MTC UEs 120*a-c* may listen to the transmission 550 from eNodeB 140.

In element 6, the MTC UEs 120*a-c* that receive the NACK feedback 550 retransmit 560 the measurement report to the D2D relaying UEs 130 using the MCS and on the resource which is indicated in the uplink grant 550 in element 5.

In element 7, D2D relaying UEs 130 attempt to decode the (retransmitted) measurement report 560 from the remaining MTC UEs and subsequently feedback 570 the ACK/NACK information and processed measurement reports to eNodeB 140. The procedure will continue until all the measurement reports 530, 560 are collected, processed by the D2D relaying UEs 130 and reported to the eNodeB 140.

Periodic MTC Resource Pool and Resource Allocation within Resource Pool

As described in relation to option 1 of the D2D assisted MTC communication, a periodic resource pool may be configured by eNodeB 140 for the transmission of MTC measurement report. Note that these resource pools may be dedicated for MTC applications or can be part of the resource pools for D2D discovery and communication. In the case when MTC bandwidth is narrower than system bandwidth, a dedicated resource pool may be configured according to the MTC bandwidth.

The time/frequency resource information for an MTC resource pool may comprise at least one of the following information—frequency location (e.g. in RB index region), time location (e.g. OFDM symbol index, slot index, subframe index, radio frame index). According to a more specific example of time resource information (signal time related information), the configuration may contain a periodicity and/or subframe offset for the MTC resource pool.

The subframes allocated for an MTC resource pool can be contiguous or non-contiguous. For instance, for an FDD system, contiguous DL subframes may be allocated for the MTC resource pool. For a TDD system, non-contiguous subframes may be allocated. For example, a subframe bit map with parameter "subframeBitMap" can be used to signal the allocated subframe, which can be repeated within the resource pool. For instance, subframeBitMap="0011000011" and length of resource pool in subframes is 20. In this case, the first and second radio frames have the same subframe bit map, and subframe #2, #3, #8 and #9 in each frame are allocated for the MTC resource pool.

Figure 6:
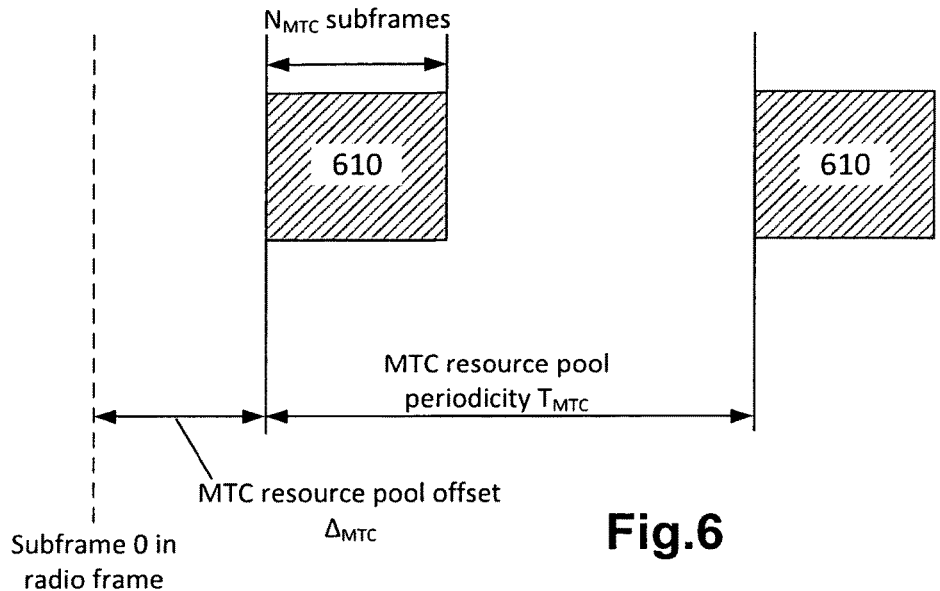
FIG. 6 illustrates an MTC resource pool in the time domain.

As shown in FIG. 6, according to some examples the first subframe of the $N_{MTC}$ downlink subframes of the connection-less uplink transmission resource pool 610, shall satisfy $(10 \times n_f + [n_s/2] - \Delta_{MTC}) \mod T_{MTC} = 0$ where $n_f$ and $n_s$ are radio frame number and slot number.

In the frequency domain, the MTC resource pool can be allocated in contiguous or non-contiguous physical resource blocks (PRBs). In one embodiment, the starting PRB with parameter "startPRB" and the size of MTC resource pool "lengthPRB" can be used to indicate the frequency information of the MTC resource pool. According to this, PRB with index greater than or equal to startPRB and less than startPRB+prbLength is allocated for MTC resource pool.

In another embodiment, two non-overlapping frequency locations can be allocated for the MTC resource pool. In particular, the starting PRB with parameter "startPRB" and the "lengthPRB1" can be used to indicate the first part of the MTC resource pool in the frequency domain, i.e., PRB with index greater than or equal to startPRB and less than startPRB+ lengthPRB1 is allocated. For the second part of the MTC resource pool, the end PRB with parameter "endPRB" and the "lengthPRB2", i.e., PRB with index lesser than or equal to endPRB and greater than endPRB− lengthPRB2 is allocated.

Note that although PRB is considered in the above examples, the frequency domain configuration may be extended based on subcarrier index, or block/group of PRBs, for example.

Figure 7:
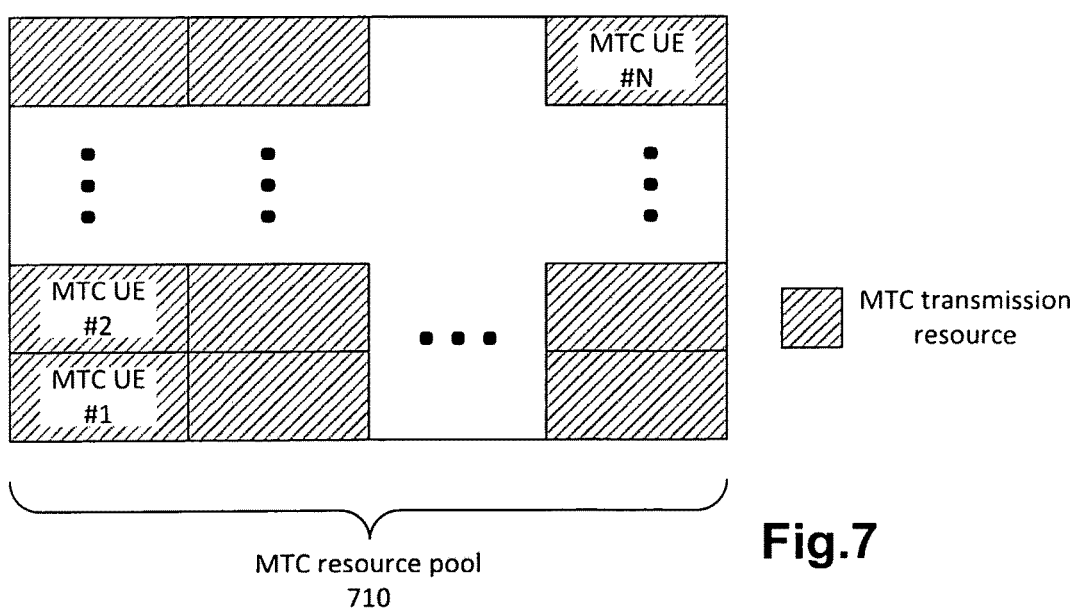
FIG. 7 illustrates an example of a resource allocation scheme for MTC transmission.

As mentioned in the detailed procedure for options 1 and 2 above, the resource allocation for the transmission of measurement reports from multiple MTE UEs 120*a-c* can be indicated in the uplink grant. FIG. 7 illustrates an example of resource allocation scheme for MTC transmission. In FIG. 7, time resources are shown on the horizontal axis, while frequency resources are shown on the vertical axis. In order to ensure all MTC devices are able transmit the data within one resource pool 710 without collision, when configuring the resource pool 710, eNodeB 140 or D2D devices 130 may guarantee that the size of resource pool 710 is not less than the number of the MTC devices 120*a-c* that intend to transmit the data or measurement report to D2D devices 130. Note that to simplify the design, MTC transmission resources can be predefined in a similar manner to D2D discovery, i.e., one MTC transmission resource occupies K subframes and L PRBs for predetermined values of K and L.

Note that although the sizes of MTC transmission resource as shown in the FIG. 7 are identical for different MTC UEs. However, in some examples they may be different, depending (for example) on the packet size and MCS of measurement reports for each MTC UE 120*a-c*.

Architecture and High Level Procedure for Relaying Assisted MTC

Figure 8:
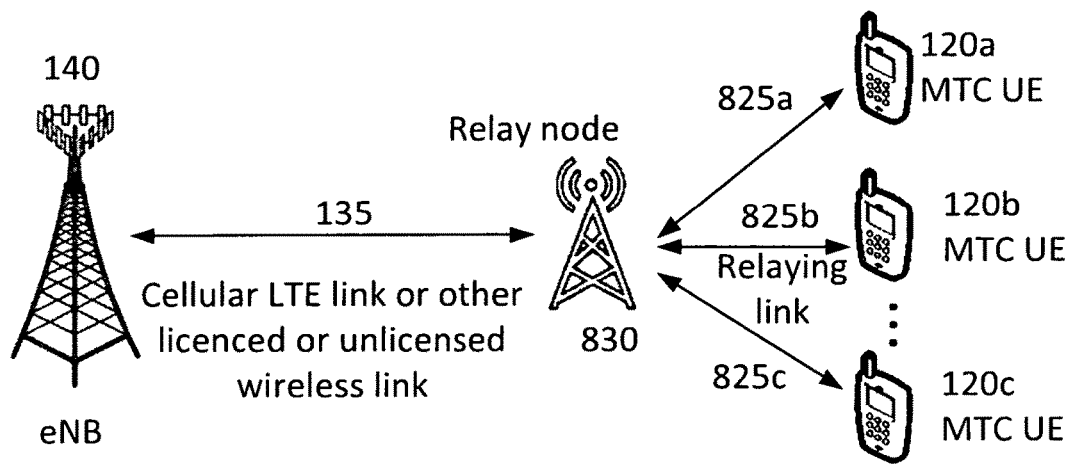
FIG. 8 illustrates an architecture for relaying assisted MTC.

FIG. 8 illustrates an architecture for relaying assisted MTC. Unlike the D2D assisted MTC, MTC devices 120*a-c* may access and acquire the necessary information from the relaying node 830. The relaying node 830 may schedule the MTC devices 120*a-c* to transmit the data or measurement report via relaying links 825*a-c*. After the relaying node 830 collects all the data and processes the information, it may communicate with eNodeB 140 and forward the processed information to the eNodeB 140 via cellular LTE radio link 135 or other licensed or unlicensed wireless link 135.

Figure 9:
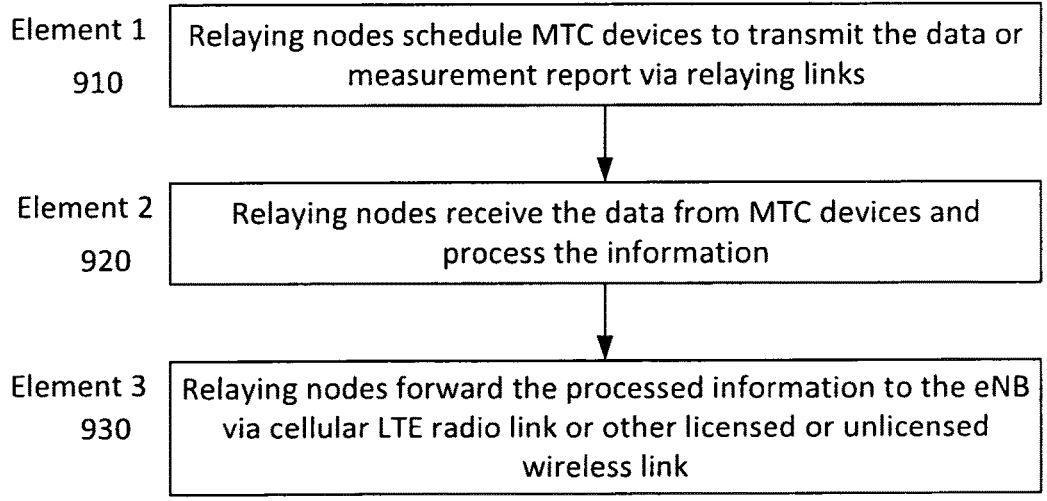
FIG. 9 illustrates a procedure for relaying assisted MTC.

As shown in the FIG. 9, a detailed procedure for relaying assisted MTC may include the following elements:

Element 1 910: Relaying nodes 830 schedule MTC devices 120*a-c* to transmit the data or measurement report via relaying links 825*a-c*.

Element 2 920: Relaying nodes 830 receive the data from MTC devices 120*a-c* and process the information.

Element 3 930: Relaying nodes 830 forward the processed information to the eNodeB 1 40 via cellular LTE radio link 135 or other licensed and unlicensed wireless link 135.

Figure 10:
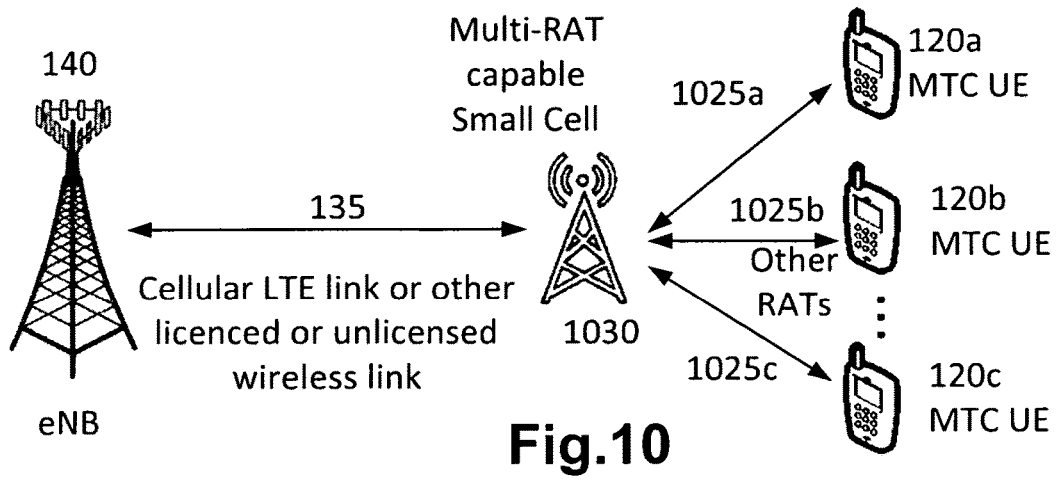
FIG. 10 illustrates an architecture for multi-RAT (Radio Access Technology) capable small cell assisted MTC.

Architecture and High Level Procedure for Multi-RAT Capable Small Cell Assisted MTC FIG. 10 illustrates an architecture for multi-RAT capable small cell 1030 assisted MTC. In particular, MTC devices 120*a-c* communicate with small cells 1030 via other RATs, e.g., WiFi, Bluetooth, LTE-Unlicensed, mmWave, etc., while small cells 1030 communicate with eNodeB 140 via cellular LTE radio link 135 or other licensed and unlicensed wireless links 135.

Figure 11:
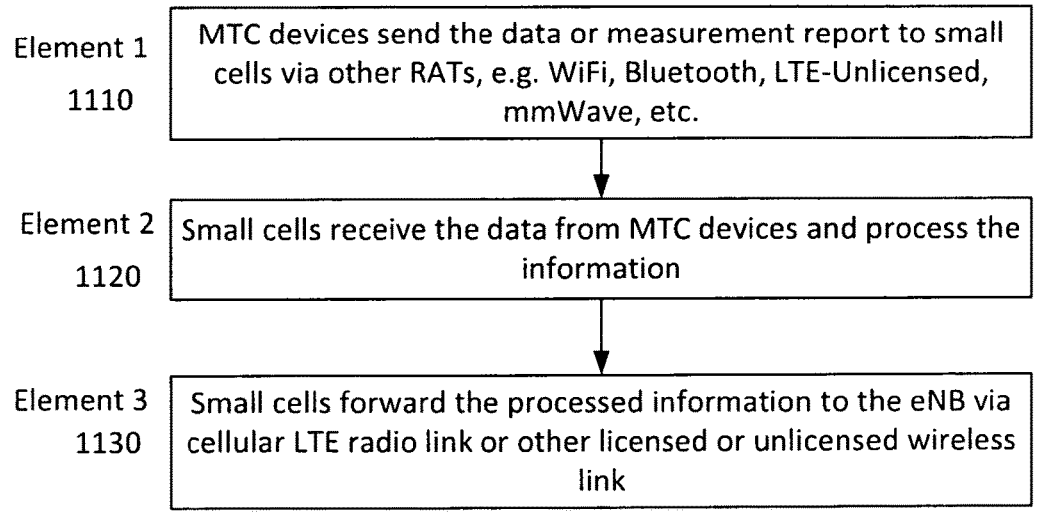
FIG. 11 illustrates a procedure for multi-RAT capable small cell assisted MTC.

As shown in the FIG. 11, the detailed procedure for multi-RAT capable small cell 1030 assisted MTC may include at least the following elements:

Element 1 1110: MTC devices 120*a-c* send the data or measurement report to small cells 1030 via other RATs, e.g., WiFi, Bluetooth, LTE-Unlicensed, mmWave, etc.

Element 2 1120: Small cells 1030 receive the data from MTC devices 120*a-c* and process the information.

Element 3 1130: Small cells 1030 forward the processed information to the eNodeB 1040 via cellular LTE radio link 135 or other licensed and unlicensed wireless link 135.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
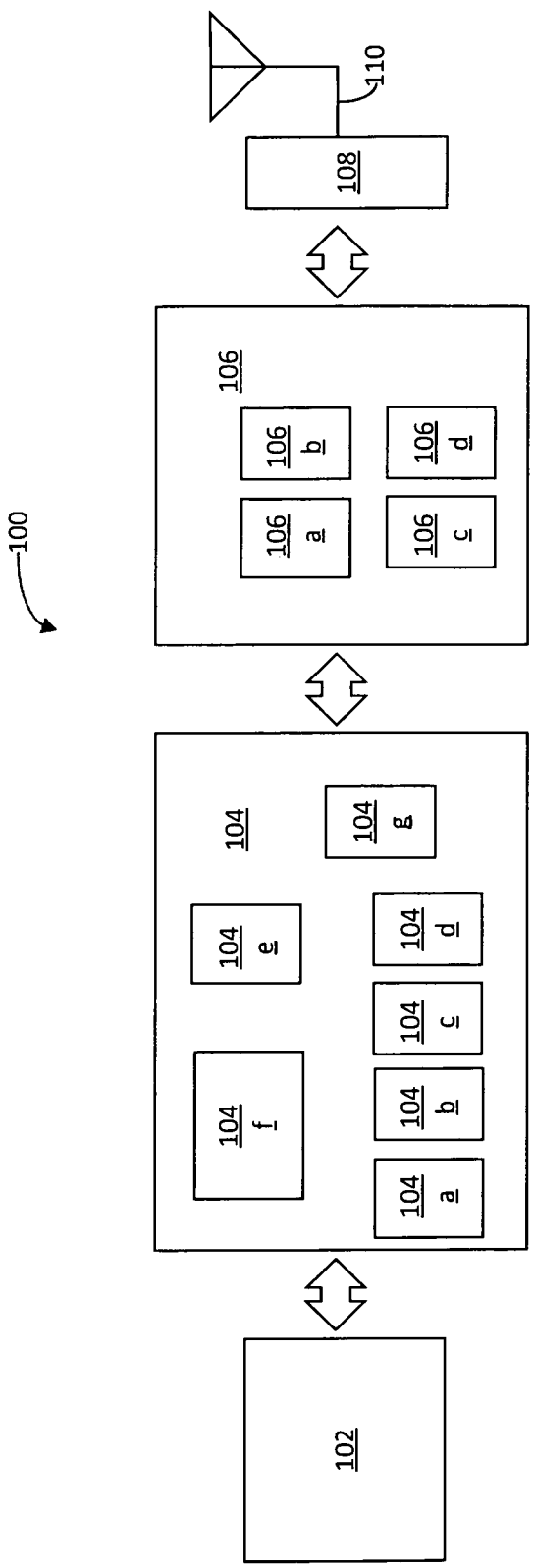
FIG. 12 illustrates example components in accordance with some examples.

Embodiments described herein may be implemented into a system using any suitably configured hardware and/or software. FIG. 12 illustrates, for one embodiment, example components of an electronic device 100. In embodiments, the electronic device 100 may be a user equipment (UE), an evolved NodeB (eNB), an MTC device, a D2D relay device, or some other electronic device. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104*a*, third generation (3G) baseband processor 104*b*, fourth generation (4G) baseband processor 104*c*, and/or other baseband processor(s) 104*d* for other existing generations, generations in development or to be developed in the future (e.g., fifth generation (5G), 6G, etc.). The baseband circuitry 104 (e.g., one or more of baseband processors 104*a-d*) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104*e* of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104*f*. The audio DSP(s) 104*f* may be include elements for compression/decompression and echo cancellation and may include other suitable processing elements in other embodiments.

The baseband circuitry 104 may further include memory/storage 104*g*. The memory/storage 104*g* may be used to load and store data and/or instructions for operations performed by the processors of the baseband circuitry 104. Memory/storage for one embodiment may include any combination of suitable volatile memory and/or non-volatile memory. The memory/storage 104*g* may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104*g* may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry. RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface. In some embodiments, the electronic device 100 may be incorporated in a UE or MTC relay device, the UE or MYC relay device may also have one or more of memory/storage, a display, a camera, a sensor, or an input/output (I/O) interface.

In some embodiments, the electronic device 100 may be included in a UE or an MTC relay device, and may include one or more of memory/storage, a display, a camera, a sensor, or an input/output (I/O) interface. In embodiments where the electronic device 100 is, implements, is incorporated into, or is otherwise part of a D2D relay device 130, the RF circuitry 106 may be to receive, from a Machine Type Communication (MTC) device 120*a-c*, a data and/or measurement report in an allocated resource via D2D sidelink 125*a-c*; and transmit a processed data and/or measurement report to an evolved NodeB 140 (eNB) via a cellular long term evolution (LTE) radio link 135 or other licensed and/or unlicensed wireless link 135.

In embodiments where the electronic device 100 is, implements, is incorporated into, or is otherwise part of a relaying node 830, the RF circuitry 106 may be to receive, from a Machine Type Communication (MTC) device 120*a-c*, a data and/or measurement report, possibly in an allocated resource, via relaying link 825*a-c*; and transmit a processed data and/or measurement report to an evolved NodeB 140 via a cellular long term evolution (LTE) radio link 135 or other licensed and/or unlicensed wireless link 135.

In embodiments where the electronic device 100 is, implements, is incorporated into, or is otherwise part of a multi-RAT small cell device 1030, the RF circuitry 106 may be to receive, from a Machine Type Communication (MTC) device 120*a-c*, a data and/or measurement report, possibly in an allocated resource, via a link 125*a-c* according to a RAT of the multi-RAT small cell device; and transmit a processed data and/or measurement report to an evolved NodeB 140 (eNB) via a cellular long term evolution (LTE) radio link 135 or other licensed and/or unlicensed wireless link 135.

Figure 13:
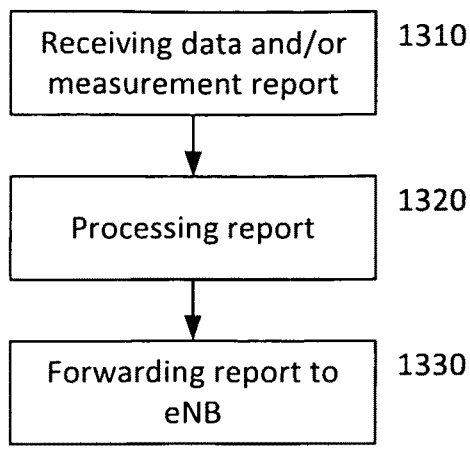
FIG. 13 illustrates a method in accordance with some examples.

In some embodiments, the electronic device 100 of FIG. 12 may be configured to perform one or more processes, techniques, and/or methods as described herein, or portions thereof. One such process is depicted in FIG. 13. For example, in embodiments where the electronic device 100 is, implements, is incorporated into, or is otherwise part of a D2D relay device 130, or a portion thereof, the process may include receiving 1310, by a device-to-device (D2D) relay device 130 from a Machine Type Communication (MTC) device 120*a-c*, a data and/or measurement report in an allocated resource via D2D sidelink 125*a-c*; processing, by the D2D relay device 130, the data and/or measurement report; and transmitting, by the D2D relay device 130, the processed data and/or measurement report to an evolved NodeB 140 via a cellular long term evolution (LTE) radio link 135 or other licensed and/or unlicensed wireless link 135.

In embodiments where the electronic device 100 is, implements, is incorporated into, or is otherwise part of a relaying node 830, or a portion thereof, the process of FIG. 13 may include receiving 1310, by the relaying device 830 from a Machine Type Communication (MTC) device 120*a-c*, a data and/or measurement report, possibly in an allocated resource, via relaying link 825*a-c*; processing, by the relaying device 830, the data and/or measurement report; and transmitting, by the relaying device 830, the processed data and/or measurement report to an evolved NodeB 140 via a cellular long term evolution (LTE) radio link 135 or other licensed and/or unlicensed wireless link 135.

In embodiments where the electronic device 100 is, implements, is incorporated into, or is otherwise part of a multi-RAT small cell device 1030, or a portion thereof, the process of FIG. 13 may include receiving 1310, by the relaying device 1030 from a Machine Type Communication (MTC) device 120*a-c*, a data and/or measurement report, possibly in an allocated resource, via link 825*a-c* according to a RAT of the multi-RAT small cell device; processing, by the relaying device 1030, the data and/or measurement report; and transmitting, by the relaying device 1030, the processed data and/or measurement report to an evolved NodeB 140 via a cellular long term evolution (LTE) radio link 135 or other licensed and/or unlicensed wireless link 135.

The electronic device 100 may include circuitry, e.g. as receive circuitry, having a receive signal path to receive data from at least one MTC device, and a transmit signal path to forward processed data, based on the data, to an evolved NodeB (eNB), wherein at least one of: (a) the data is received via D2D (Device-to-Device) sidelink, (b) the MTC relay device is a relay node and the data is received via a relaying link, or (c) the MTC relay device is a multi-radio access technology (multi-RAT) capable small cell device and the data is received via WiFi, Bluetooth, LTE-Unlicensed, or mmWave communication.

In some examples the circuitry may be a processing device, with the receive signal path may be a data input to the processing device and the transmit signal path being a data output, e.g. for outputting data to be transmitted by RF circuitry (possibly with further processing between the data being output and received by the RF circuitry).

The electronic device may include processing circuitry, for example within the application circuitry 102. The processing circuitry may be arranged to perform operations on the received data. For example, processing may include applying statistical functions (such as a mean, median, mode, standard deviation, etc. calculation), selecting/discarding data, applying functions or algorithms to the information, etc.

The circuitry (receive circuitry, processing circuitry, etc) may include hardware, software and/or firmware components, as described above in relation to the application circuitry 102.

Figure 14:
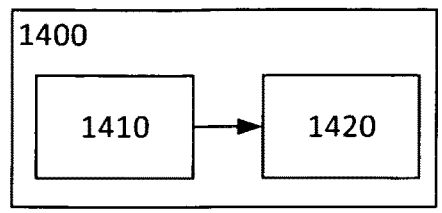
FIG. 14 illustrates a device in accordance with some examples.

According to some examples, the electronic device 1400 illustrated in FIG. 14 may be for use in, or may be, an MTC device. The device 1400 may include logic 1410 to produce data, such as a measurement report. The data or measurement report may be generated by processing sensor information received from a sensor, for example. The sensor information may describe a measurement or sensing result of the sensor. The sensor may be included in the MTC device.

The electronic device may further include circuitry 1420 to output the data for transmission to an eNB 140 via an MTC relay device 130, 830, 1030 wherein at least one of: (a) the data is to be transmitted via D2D (Device-to-Device) sidelink, (b) the MTC relay device is a relay node and the data is to be transmitted via a relaying link; or (c) the MTC relay device is a multi-radio access technology (multi-RAT)

capable small cell device and the data is to be transmitted via WiFi, Bluetooth, LTE-Unlicensed, or mmWave communication.

Figure 15:
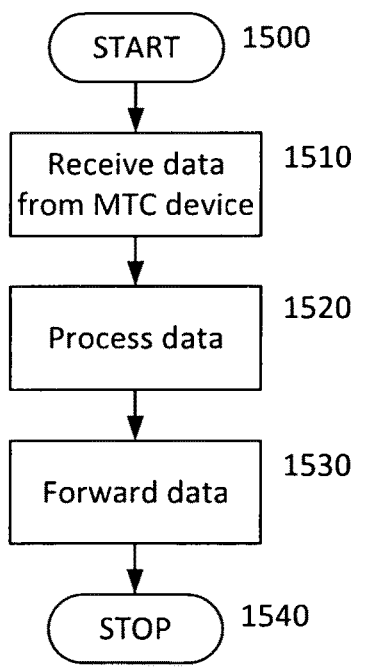
FIG. 15 illustrates a method in accordance with some examples.

The logic may have a similar structure to the application circuitry 102, described above. The logic may be implemented in hardware, software, firmware, etc., or some combination of these. The circuitry to output the data may include software, hardware, etc. to provide the data to another component. In some examples, the circuitry to output the data may include one or more of application circuitry, baseband circuitry, RF circuitry, FEM circuitry and/or one or more antennas, similar to the circuitry described above in relation to FIG. 12, FIG. 15 illustrates a method according to some examples. The method may be performed by an MTC relay device 130, 830, 1030, or by an electrical device that may be suitable for use in an MTC relay device 130, 830, 1030. The method begins at 1500, and at 1510 data (e.g. a measurement report) is received from an MTC device 120*a-c*. The information may be received via components, such as radio equipment and radio processing components connected with or forming part of the MTC relay device. At 1520 the MTC relay device may process the data to produce processed data (this may be performed by a processor or application circuitry, for example). At 1530 the MTC relay device forwards the processed data to an eNB, wherein at least one of: (a) the data is received via D2D (Device-to-Device) sidelink, (b) the MTC relay device is a relay node and the data is received via a relaying link, or (c) the MTC relay device is a multi-radio access technology (multi-RAT) capable small cell device and the data is received via WiFi, Bluetooth, LTE-Unlicensed, or mmWave communication.

Figure 16:
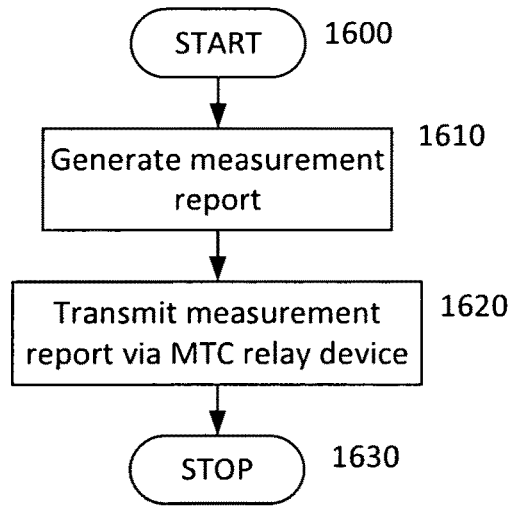
FIG. 16 illustrates a method in accordance with some examples.

FIG. 16 illustrates a method according to some examples. The method may be performed by an MTC device 120*a-c*, or by an electrical device that may be suitable for use in an MTC device 120*a-c*. The method begins at 1600, and at 1610 data (e.g. a measurement report) is produced by the MTC device 120*a-c*. The measurement report may be generated by a processor, a sensor or a combination of sensors and processors, for example. At 1620 the data is transmitted to an eNB 140 (e.g. forwarded towards an eNB 140) via an MTC relay device 130, 830, 1030, wherein at least one of: (a) the measurement report is transmitted via D2D (Device-to-Device) sidelink, (b) the MTC relay device is a relay node and the measurement report is transmitted via a relaying link, or (c) the MTC relay device is a multi-radio access technology (multi-RAT) capable small cell device and the measurement report is transmitted via WiFi, Bluetooth, LTE-Unlicensed, or mmWave communication.

Throughout the description, reference has been made to "device-to-device" or "D2D", however, reference may equally be made to "proximity services (ProSe)." Accordingly, proximity services/ProSe may be used interchangeably with device-to-device/D2D herein.

EXAMPLES

Example 1 may include a system and method of wireless communication for a fifth generation (5G), comprising:
Transmitting, by one or a plurality of Machine Type Communication (MTC) devices, data or measurement report in the allocated resource via Device-to-Device (D2D) sidelink.
Receiving, by one or a plurality of D2D relaying devices, the measurement reports from the MTC devices.
Sending, by the D2D relaying devices, the processed measurement reports to eNodeB via cellular LTE radio link or other licensed and unlicensed wireless link.

Example 2 may include the method of example 1 or some other example herein, wherein two hop communication is employed for D2D relaying devices to forward the local measurement to the eNodeB in the case when MTC devices are located outside network coverage.

Example 3 may include the method of example 1 or some other example herein, wherein association rule that one or multiple MTC devices are associated with one or multiple D2D relaying devices is predetermined or semi-static.

Example 4 may include the method of example 3 or some other example herein, wherein D2D UEs manually input the identifier (ID) of the MTC devices in the database. The ID can be in the form of Media Access Control (MAC) address or International Mobile Subscriber Identity (IMSI) of the MTC devices.

Example 5 may include the method of example 3 or some other example herein, wherein D2D UEs trigger the MTC devices to report their IDs in the MTC resource pool; wherein the triggering message is transmitted in the Physical sidelink Control Channel (PSCCH) or Physical sidelink Discovery Channel (PSDCH) and subsequently, MTC devices report their IDs in the Physical sidelink Shared Channel (PSSCH).

Example 6 may include the method of example 1 or some other example herein, wherein the MTC devices only communicate with the D2D UEs and all operations occur on the UL subframes/carriers; wherein D2D relaying UEs broadcast configuration of resources towards MTC devices.

Example 7 may include the method of example 6 or some other example herein, wherein the D2D relaying UE requests the resource in sidelink for the transmission of MTC reports; wherein the resource request may carry the information regarding the number of MTC devices and buffer status report (BSR) for each MTC report and/or the capability of each MTC device.

Example 8 may include the method of example 6 or some other example herein, wherein eNodeB sends out the resource allocation for the transmission of MTC reports over sidelinks; wherein eNodeB indicates the logical periodic D2D resource pool for the transmission and retransmission of MTC report, wherein the logical periodic resource pool may be mapped to the periodic instances of physical channel (PSCCH/PSSCH); wherein the resource allocation may contain the maximum number of retransmission allowed for each MTC report.

Example 9 may include the method of example 6 or some other example herein, wherein D2D relaying UE sends out the sidelink transmission grant via PSCCH for MTC reports; wherein the transmission grant may contain the detailed resource allocation and modulation and coding scheme (MCS) for each MTC measurement report, including but not limited to time and frequency allocation for MTC UE transmission, e.g. time resource pattern of transmission (T-RPT) pattern index, assignment of frequency resources and potentially PSCCH resource index.

Example 10 may include the method of example 6 or some other example herein, wherein all MTC UEs report the measurement on the corresponding resource within resource pool which is indicated in the uplink grant; wherein the measurement report is transmitted via PSSCH or separate sidelink physical channel.

Example 11 may include the method of example 6 or some other example herein, wherein D2D relaying UEs receive and attempt to decode the measurement reports from multiple MTC UEs; Subsequently, D2D relaying UEs feedback the ACK/NACK information and resource allocation and MCS for the retransmission of the MTC report if they are not successfully decoded.

Example 12 may include the method of example 6 or some other example herein, wherein for these MTC UEs who receive the NACK feedback, they retransmits the measurement report to the D2D relaying UEs using the MCS and on the resource which is indicated in the uplink grant.

Example 13 may include the method of example 6 or some other example herein, when D2D relaying UE successfully receive the measurement report from all the MTC UEs, it performs the post processing and sends out the processed measurement report to the eNodeB via physical uplink shared channel (PUSCH).

Example 14 may include the method of example 1 or some other example herein, wherein the MTC UEs also communicate with (at least receive from) the eNodeB and at least transmit to the D2D UE.

Example 15 may include the method of example 14 or some other example herein, wherein D2D relaying UE requests the resource in sidelink for the transmission of MTC reports; wherein the resource request may carry the information regarding the number of MTC devices and buffer status report (BSR) for each MTC report and/or the capability of each MTC device.

Example 16 may include the method of example 14 or some other example herein, wherein eNodeB sends out the resource allocation for the transmission of MTC reports over sidelinks; wherein both D2D relaying UEs and all MTC UEs listen to the resource allocation from eNodeB; wherein downlink control information (DCI) format 3/3A scrambled by MTC-C-RNTI is used to support the MTC group based signaling, wherein MTC-C-RNTI is predefined in the specification or configured by higher layers via master information block (MIB), system information block (SIB) or dedicated RRC signalling Example 17 may include the method of example 14 or some other example herein, wherein all MTC UEs report the measurement on the corresponding resource within resource pool which is indicated in the resource allocation from eNodeB;

Example 18 may include the method of example 14 or some other example herein, wherein D2D relaying UEs attempt to decode the measurement report from all MTC UEs. Subsequently, D2D relaying UEs feedback via PUSCH the ACK/NACK information and processed measurement reports to eNodeB from these are successfully decoded.

Example 19 may include the method of example 14 or some other example herein, wherein eNodeB feedbacks the ACK/NACK information and resource allocation and MCS for the retransmission of the MTC report if they are not successfully decoded.

Example 20 may include the method of example 14 or some other example herein, wherein for these MTC UEs who receive the NACK feedback, they retransmits the measurement report to the D2D relaying UEs using the MCS and on the resource which is indicated in the uplink grant.

Example 21 may include the method of example 14 or some other example herein, wherein D2D relaying UEs attempt to decode the measurement report from the remaining MTC UEs and subsequently feedback the ACK/NACK information and processed measurement reports to eNodeB; wherein the procedure will continue until all the measurement reports are collected, processed by the D2D relaying UEs and reported to the eNodeB.

Example 22 may include the method of example 1 or some other example herein, wherein the time/frequency resource information for MTC resource pool may comprise at least one of the following information—frequency location (e.g. in RB index region), time location (e.g. OFDM symbol index, slot index, subframe index, radio frame index); wherein a subframe bit map with parameter "subframeBitMap" is used to signal the allocated subframe, which can be repeated within the resource pool.

Example 23 may include the method of example 22 or some other example herein, wherein the starting PRB with parameter "startPRB" and the size of MTC resource pool "lengthPRB" are used to indicate the frequency information of the MTC resource pool.

Example 24 may include the method of example 22 or some other example herein, wherein two non-overlapping frequency locations are allocated for the MTC resource pool.

Example 25 may include the method of example 22 or some other example herein, wherein the size of resource pool is not less than the number of the MTC devices that intend to transmit the data or measurement report to D2D devices;

Example 26 may include the method of example 1 or some other example herein, wherein relaying nodes schedule MTC devices to transmit the data or measurement report via relaying links; wherein relaying nodes receive the data from MTC devices and process the information; wherein relaying nodes forward the processed information to the eNodeB via cellular LTE radio link or other licensed and unlicensed wireless link.

Example 27 may include the method of example 1 or some other example herein, wherein MTC devices send the data or measurement report to small cells via other RATs, e.g., WiFi, Bluetooth, LTE-Unlicensed, mmWave, etc; wherein small cells receive the data from MTC devices and process the information; wherein small cells forward the processed information to the eNodeB via cellular LTE radio link or other licensed and unlicensed wireless link.

Example 28 may include a method comprising:
receiving, by a device-to-device (D2D) relay device from a Machine Type Communication (MTC) device, a data and/or measurement report in an allocated resource via D2D sidelink;
processing, by the D2D relay device, the data and/or measurement report; and
transmitting, by the D2D relay device, the processed data and/or measurement report to an evolved NodeB (eNB) via a cellular long term evolution (LTE) radio link or other licensed and/or unlicensed wireless link.

Example 29 may include the method of example 28 or some other example herein, further comprising employing, by the D2D relay device, two hop communication to forward the processed data and/or measurement report to the eNB in the case when the MTC devices are located outside network coverage.

Example 30 may include the method of example 28 or some other example herein, wherein one or more MTC devices are associated with one or more D2D relay devices based on a predetermined or semi-static association rule.

Example 31 may include the method of example 30 or some other example herein, wherein the D2D relay device is to manually input the identifier (ID) of one or more MTC device(s) in the database. The ID can be in the form of Media Access Control (MAC) address or International Mobile Subscriber Identity (IMSI) of the MTC device(s).

Example 32 may include the method of example 30 or some other example herein, wherein the D2D relay device is to trigger the MTC device(s) to report their IDs in the MTC resource pool; wherein the triggering message is transmitted in the Physical sidelink Control Channel (PSCCH) or Physical sidelink Discovery Channel (PSDCH) and subsequently, MTC devices report their IDs in the Physical sidelink Shared Channel (PSSCH).

Example 33 may include the method of example 28 or some other example herein, wherein the MTC device is to only communicate with the D2D relay device and all operations occur on the UL subframes/carriers; wherein the D2D relay device is to broadcast configuration of resources towards MTC devices.

Example 34 may include the method of example 33 or some other example herein, wherein the D2D relay device is to request the resource in sidelink for the transmission of MTC reports; wherein the resource request may carry the information regarding the number of MTC devices and buffer status report (BSR) for each MTC report and/or the capability of each MTC device.

Example 35 may include the method of example 33 or some other example herein, wherein the eNB is to transmit an indication of the resource allocation for the transmission of MTC reports over sidelinks; wherein the eNB indicates the logical periodic D2D resource pool for the transmission and retransmission of MTC report, wherein the logical periodic resource pool may be mapped to the periodic instances of physical channel (PSCCH/PSSCH); wherein the resource allocation may contain the maximum number of retransmission allowed for each MTC report.

Example 36 may include the method of example 33 or some other example herein, wherein the D2D relay device is to transmit the sidelink transmission grant via PSCCH for MTC reports; wherein the transmission grant may contain the detailed resource allocation and modulation and coding scheme (MCS) for each MTC measurement report, including but not limited to time and frequency allocation for MTC device transmission, e.g. time resource pattern of transmission (T-RPT) pattern index, assignment of frequency resources and potentially PSCCH resource index.

Example 37 may include the method of example 33 or some other example herein, wherein one or more MTC devices report the measurement on the corresponding resource within resource pool which is indicated in the uplink grant; wherein the measurement report is transmitted via PSSCH or separate sidelink physical channel.

Example 38 may include the method of example 33 or some other example herein, wherein the D2D relay device is to receive and attempt to decode the measurement reports from multiple MTC devices; subsequently, the D2D relay device is to feedback the ACK/NACK information and resource allocation and MCS for the retransmission of the MTC report if they are not successfully decoded.

Example 39 may include the method of example 33 or some other example herein, wherein for these MTC devices who receive the NACK feedback, they are to retransmit the measurement report to the D2D relay device using the MCS and on the resource which is indicated in the uplink grant.

Example 40 may include the method of example 33 or some other example herein, when the D2D relay device successfully receives the measurement report from one or more MTC devices, it performs the post processing and transmits the processed measurement report to the eNB via physical uplink shared channel (PUSCH).

Example 41 may include the method of example 28 or some other example herein, wherein one or more MTC devices are also to communicate with (at least receive from) the eNB and at least transmit to the D2D UE.

Example 42 may include the method of example 41 or some other example herein, wherein the D2D relay device is to request the resource in sidelink for the transmission of MTC reports; wherein the resource request may carry the information regarding the number of MTC devices and buffer status report (BSR) for each MTC report and/or the capability of each MTC device.

Example 43 may include the method of example 41 or some other example herein, wherein the eNB is to transmit the resource allocation for the transmission of MTC reports over sidelinks; wherein both the D2D relay device and one or more MTC devices are to listen to the resource allocation from eNB; wherein downlink control information (DCI) format 3/3A scrambled by MTC-C-RNTI is used to support the MTC group based signaling, wherein MTC-C-RNTI is predefined in the specification or configured by higher layers via master information block (MIB), system information block (SIB) or dedicated RRC signalling.

Example 44 may include the method of example 41 or some other example herein, wherein one or more MTC devices are to report the measurement on the corresponding resource within resource pool which is indicated in the resource allocation from eNB.

Example 45 may include the method of example 41 or some other example herein, wherein the D2D relay device is to attempt to decode the measurement report from one or more MTC devices. Subsequently, the D2D relay device is to feedback via PUSCH the ACK/NACK information and processed measurement reports to the eNB from those that are successfully decoded.

Example 46 may include the method of example 41 or some other example herein, wherein the eNB is to feedback the ACK/NACK information and resource allocation and MCS for the retransmission of the MTC report if they are not successfully decoded.

Example 47 may include the method of example 41 or some other example herein, wherein for these MTC devices who receive the NACK feedback, they are to retransmit the measurement report to the D2D relay device using the MCS and on the resource which is indicated in the uplink grant.

Example 48 may include the method of example 41 or some other example herein, wherein D2D relaying UEs attempt to decode the measurement report from the remaining MTC devices and subsequently feedback the ACK/NACK information and processed measurement reports to eNB; wherein the procedure will continue until all the measurement reports are collected, processed by the D2D relaying UEs and reported to the eNB.

Example 49 may include the method of example 28 or some other example herein, wherein the time/frequency resource information for MTC resource pool may include at least one of the following information—frequency location (e.g. in RB index region), time location (e.g. OFDM symbol index, slot index, subframe index, radio frame index); wherein a subframe bit map with parameter "subframeBitMap" is used to signal the allocated subframe, which can be repeated within the resource pool.

Example 50 may include the method of example 49 or some other example herein, wherein the starting PRB with parameter "startPRB" and the size of MTC resource pool "lengthPRB" are used to indicate the frequency information of the MTC resource pool.

Example 51 may include the method of example 49 or some other example herein, wherein two non-overlapping frequency locations are allocated for the MTC resource pool.

Example 52 may include the method of example 49 or some other example herein, wherein the size of resource pool is not less than the number of the MTC devices that intend to transmit the data or measurement report to D2D devices.

Example 53 may include the method of example 28 or some other example herein, wherein relaying nodes are to schedule MTC devices to transmit the data or measurement report via relaying links; wherein relaying nodes receive the data from MTC devices and process the information; wherein relaying nodes forward the processed information to the eNB via cellular LTE radio link or other licensed and unlicensed wireless link.

Example 54 may include the method of example 28 or some other example herein, wherein the MTC devices are to send the data or measurement report to small cells via other RATs, e.g., WiFi, Bluetooth, LTE-Unlicensed, mmWave, etc; wherein small cells receive the data from MTC devices and process the information; wherein small cells forward the processed information to the eNB via cellular LTE radio link or other licensed and unlicensed wireless link.

Example 55 may include a device-to-device (D2D) relay device comprising:
 radio frequency (RF) circuitry to receive, from a Machine Type Communication (MTC) device, a data and/or measurement report in an allocated resource via D2D sidelink; and
 transmit a processed data and/or measurement report to an evolved NodeB (eNB) via a cellular long term evolution (LTE) radio link or other licensed and/or unlicensed wireless link.

Example 56 may include the D2D relay device of example 55 or some other example herein, wherein the RF circuitry is further to employ two hop communication to forward the processed data and/or measurement report to the eNB in the case when the MTC devices are located outside network coverage.

Example 57 may include the D2D relay device of example 55 or some other example herein, wherein one or more MTC devices are associated with one or more D2D relay devices based on a predetermined or semi-static association rule.

Example 58 may include the D2D relay device of example 57 or some other example herein, wherein D2D the D2D relay device is to manually input the identifier (ID) of the MTC devices in the database. The ID can be in the form of Media Access Control (MAC) address or International Mobile Subscriber Identity (IMSI) of the MTC devices.

Example 59 may include the D2D relay device of example 57 or some other example herein, wherein the D2D relay device is to trigger the MTC devices to report their IDs in the MTC resource pool; wherein the triggering message is transmitted in the Physical sidelink Control Channel (PSCCH) or Physical sidelink Discovery Channel (PSDCH) and subsequently, MTC devices report their IDs in the Physical sidelink Shared Channel (PSSCH).

Example 60 may include the D2D relay device of example 55 or some other example herein, wherein the MTC devices are to only communicate with the D2D relay device and all operations occur on the UL subframes/carriers; wherein the D2D relay device is to broadcast configuration of resources towards MTC devices.

Example 61 may include the D2D relay device of example 60 or some other example herein, wherein the D2D relay device is to request the resource in sidelink for the transmission of MTC reports; wherein the resource request may carry the information regarding the number of MTC devices and buffer status report (BSR) for each MTC report and/or the capability of each MTC device.

Example 62 may include the D2D relay device of example 60 or some other example herein, wherein eNB sends out the resource allocation for the transmission of MTC reports over sidelinks; wherein eNB indicates the logical periodic D2D resource pool for the transmission and retransmission of MTC report, wherein the logical periodic resource pool may be mapped to the periodic instances of physical channel (PSCCH/PSSCH); wherein the resource allocation may contain the maximum number of retransmission allowed for each MTC report.

Example 63 may include the D2D relay device of example 60 or some other example herein, wherein the D2D relay device is to send out the sidelink transmission grant via PSCCH for MTC reports; wherein the transmission grant may contain the detailed resource allocation and modulation and coding scheme (MCS) for each MTC measurement report, including but not limited to time and frequency allocation for MTC device transmission, e.g. time resource pattern of transmission (T-RPT) pattern index, assignment of frequency resources and potentially PSCCH resource index.

Example 64 may include the D2D relay device of example 60 or some other example herein, wherein one or more MTC devices are to report the measurement on the corresponding resource within resource pool which is indicated in the uplink grant; wherein the measurement report is transmitted via PSSCH or separate sidelink physical channel.

Example 65 may include the D2D relay device of example 60 or some other example herein, wherein the D2D relaying device is to receive and attempt to decode the measurement reports from multiple MTC devices; Subsequently, the D2D relay device is to feedback the ACK/NACK information and resource allocation and MCS for the retransmission of the MTC report if they are not successfully decoded.

Example 66 may include the D2D relay device of example 60 or some other example herein, wherein for these MTC devices who receive the NACK feedback, they are to retransmit the measurement report to the D2D relay device using the MCS and on the resource which is indicated in the uplink grant.

Example 67 may include the D2D relay device of example 60 or some other example herein, when the D2D relay device is to successfully receive the measurement report from one or more MTC devices, it is to further perform the post processing and send out the processed measurement report to the eNB via physical uplink shared channel (PUSCH).

Example 68 may include the D2D relay device of example 55 or some other example herein, wherein one or more MTC devices also communicate with (at least receive from) the eNB and at least transmit to the D2D relay device.

Example 69 may include the D2D relay device of example 68 or some other example herein, wherein the D2D relay device is to request the resource in sidelink for the transmission of MTC reports; wherein the resource request may carry the information regarding the number of MTC devices and buffer status report (BSR) for each MTC report and/or the capability of each MTC device.

Example 70 may include the D2D relay device of example 68 or some other example herein, wherein the eNB is to transmit the resource allocation for the transmission of MTC reports over sidelinks; wherein both the D2D relay device and one or more MTC devices listen to the resource allocation from eNB; wherein downlink control information (DCI) format 3/3A scrambled by MTC-C-RNTI is used to support the MTC group based signaling, wherein MTC-C-

RNTI is predefined in the specification or configured by higher layers via master information block (MIB), system information block (SIB) or dedicated RRC signalling.

Example 71 may include the D2D relay device of example 68 or some other example herein, wherein all MTC devices report the measurement on the corresponding resource within resource pool which is indicated in the resource allocation from eNB.

Example 72 may include the D2D relay device of example 68 or some other example herein, wherein the D2D relay device is to attempt to decode the measurement report from all MTC devices. Subsequently, the D2D relay device is to feedback via PUSCH the ACK/NACK information and processed measurement reports to eNB from these are successfully decoded.

Example 73 may include the D2D relay device of example 68 or some other example herein, wherein the eNB is to feedback the ACK/NACK information and resource allocation and MCS for the retransmission of the MTC report if they are not successfully decoded.

Example 74 may include the D2D relay device of example 68 or some other example herein, wherein for these MTC devices who receive the NACK feedback, they are to retransmit the measurement report to the D2D relay device using the MCS and on the resource which is indicated in the uplink grant.

Example 75 may include the D2D relay device of example 68 or some other example herein, wherein the D2D relay device is to attempt to decode the measurement report from the remaining MTC devices and subsequently feedback the ACK/NACK information and processed measurement reports to eNB; wherein the procedure will continue until all the measurement reports are collected, processed by the D2D relay device and reported to the eNB.

Example 76 may include the D2D relay device of example 55 or some other example herein, wherein the time/frequency resource information for MTC resource pool may comprise at least one of the following information—frequency location (e.g. in RB index region), time location (e.g. OFDM symbol index, slot index, subframe index, radio frame index); wherein a subframe bit map with parameter "subframeBitMap" is used to signal the allocated subframe, which can be repeated within the resource pool.

Example 77 may include the D2D relay device of example 76 or some other example herein, wherein the starting PRB with parameter "startPRB" and the size of MTC resource pool "lengthPRB" are used to indicate the frequency information of the MTC resource pool.

Example 78 may include the D2D relay device of example 76 or some other example herein, wherein two non-overlapping frequency locations are allocated for the MTC resource pool.

Example 79 may include the D2D relay device of example 76 or some other example herein, wherein the size of resource pool is not less than the number of the MTC devices that intend to transmit the data or measurement report to D2D devices;

Example 80 may include the D2D relay device of example 55 or some other example herein, wherein relaying nodes are to schedule one or more MTC devices to transmit the data or measurement report via relaying links; wherein relaying nodes receive the data from the one or more MTC devices and process the information; and wherein relaying nodes forward the processed information to the eNB via cellular LTE radio link or other licensed and unlicensed wireless link.

Example 81 may include the D2D relay device of example 55 or some other example herein, wherein MTC devices send the data or measurement report to small cells via other RATs, e.g., WiFi, Bluetooth, LTE-Unlicensed, mmWave, etc; wherein small cells receive the data from MTC devices and process the information; wherein small cells forward the processed information to the eNB via cellular LTE radio link or other licensed and unlicensed wireless link.

Example 82 may include the subject matter of any of examples 1-81, wherein the D2D relay device is a user equipment (UE).

Example 83 may include the subject matter of any of examples 1-81, wherein the MTC device is a user equipment (UE).

Example 84 may include an apparatus comprising means to perform one or more elements of a method described in or related to any of examples 1-83, or any other method or process described herein.

Example 85 may include one or more computer-readable media comprising instructions to cause an electronic device, upon execution of the instructions by one or more processors of the electronic device, to perform one or more elements of a method described in or related to any of examples 1-83, or any other method or process described herein. In some examples the media may be non-transitory or non-transient computer-readable media.

Example 86 may include an apparatus comprising logic, modules, and/or circuitry to perform one or more elements of a method described in or related to any of examples 1-83, or any other method or process described herein.

Example 87 may include a method, technique, or process as described in or related to any of examples 1-83, or portions or parts thereof.

Example 88 may include a method of communicating in a wireless network as shown and described herein.

Example 89 may include a system for providing wireless communication as shown and described herein.

Example 90 may include a device for providing wireless communication as shown and described herein.

Example 91 may include an electronic device for use in a machine type communication (MTC) relay device, the electronic device comprising circuitry, the circuitry having:
 a receive signal path to receive data from at least one MTC device; and
 a transmit signal path to forward processed data, based on the data, to an evolved NodeB (eNB), wherein at least one of:
  the data is received via Device-to-Device (D2D) sidelink;
  the MTC relay device is a relay node and the data is received via a relaying link; or
  the MTC relay device is a multi-radio access technology (multi-RAT) capable small cell device and the data is received via WiFi, Bluetooth, Long-Term Evolution-Unlicensed (LTE-Unlicensed), or mmWave communication.

Example 92 ma y include the electronic device of example 91, wherein the electronic device further comprises logic to process the data to produce the processed data.

Example 93 may include the electronic device of example 91 or 92, wherein the data includes an MTC measurement report.

Example 94 may include the electronic device of any one of examples 91 to 93, wherein the MTC relay device is a D2D-capable user equipment (UE) and the data is received via D2D sidelink.

Example 95 may include the electronic device of example 94, further comprising logic to request, from the eNB, D2D sidelink resource for transmission via the D2D sidelink of the data from the MTC device to the electronic device.

Example 96 may include the electronic device of example 95, wherein the logic is to send a resource request to the eNB, the request including information regarding a number of MTC devices and a buffer status report (BSR) for each MTC report and/or a capability of each MTC device.

Example 97 may include the electronic device of example 95 or example 96, wherein the logic is to receive a resource allocation from the eNB in response to the request and send the resource allocation to the MTC device.

Example 98 may include the electronic device of any one of examples 91 to 97, further comprising logic to decode the data, and feedback acknowledgment/negative-acknowledgement (ACK/NACK) information to the MTC device depending on whether or not the data is successfully decoded.

Example 99 may include the electronic device of any one of examples 91 to 95, further comprising logic to decode the data, and feedback acknowledgment/negative-acknowledgement (ACK/NACK) information to the eNB depending on whether or not the data is successfully decoded.

Example 100 may include the electronic device of any one of examples 94 to 99, wherein the transmit signal path is to forward the processed data to the eNB via another D2D device by employing two-hop communication.

Example 101 may include an MTC relay device comprising the electronic device of any one of examples 91 to 100, and further comprising one or more of: a display, a camera, a sensor, an input/output (I/O) interface.

Example 102 may include an electronic device for use in a machine type communication (MTC) device, comprising:
  logic to produce data;
  circuitry to output the data for transmission to an eNodeB (eNB) via an MTC relay device, wherein at least one of:
    the data is to be transmitted via Device-to-Device (D2D) sidelink;
    the MTC relay device is a relay node and the data is to be transmitted via a relaying link; or
    the MTC relay device is a multi-radio access technology (multi-RAT) capable small cell device and the data is to be transmitted via WiFi, Bluetooth, Long-Term Evolution-Unlicensed (LTE-Unlicensed), or mmWave communication.

Example 103 may include the electronic device of example 102, wherein the data is transmitted via D2D sidelink.

Example 104 may include the electronic device of example 103, wherein the logic is to receive a resource allocation from the eNB, the resource allocation for transmitting the data to the MTC relay device.

Example 105 may include the electronic device of example 104, wherein the logic is to receive acknowledgment/negative-acknowledgement (ACK/NACK) information from the eNB, depending on whether or not the data is successfully decoded by the MTC relay device.

Example 106 may include the electronic device of example 103, wherein the logic is to receive a resource allocation from the MTC relay device, the resource allocation for transmitting the data to the MTC relay device.

Example 107 may include the electronic device of example 106, wherein the logic is to receive acknowledgment/negative-acknowledgement (ACK/NACK) information from the MTC relay device, depending on whether or not the data is successfully decoded by the MTC relay device.

Example 108 may include an MTC device comprising the electronic device of any one of examples 102 to 107, and further comprising a sensor to provide sensor information to the logic, the logic to process the sensor information to produce the data.

Example 109 may include one or more computer-readable media comprising instructions to cause an electronic device, upon execution of the instructions by one or more processors of the electronic device, to:
  receive data from at least one machine type communication (MTC) device;
  process the data to produce processed data; and
  forward the processed data to an eNodeB (eNB), wherein at least one of:
    the data is to be received via Device-to-Device (D2D) sidelink;
    the MTC relay device is a relay node and the data is to be received via a relaying link; or
    the MTC relay device is a multi-radio access technology (multi-RAT) capable small cell device and the data is to be received via WiFi, Bluetooth, Long-Term Evolution-Unlicensed (LTE-Unlicensed), or mmWave communication. In some examples the media may be non-transitory or non-transient computer-readable media.

Example 110 may include the media of example 109, wherein the data is received via D2D sidelink and the media further to cause the electronic device to:
  determine whether or not the data is successfully decoded, and either
  (a) feed-back acknowledgment/negative-acknowledgement (ACK/NACK) information to the MTC device based on the determination whether or not the data is successfully decoded, or
  (b) feed-back ACK/NACK information to the eNB based on the determination whether or not the data is successfully decoded.

Example 111 may include one or more computer-readable media comprising instructions to cause an electronic device, upon execution of the instructions by one or more processors of the electronic device, to:
  produce a measurement report; and
  transmit the measurement report to an eNodeB (eNB) via a machine type communication (MTC) relay device, wherein at least one of:
  the measurement report is to be transmitted via Device-to-Device (D2D) sidelink;
    the MTC relay device is a relay node and the measurement report is to be transmitted via a relaying link; or
    the MTC relay device is a multi-radio access technology (multi-RAT) capable small cell device and the measurement report is to be transmitted via WiFi, Bluetooth, Long-Term Evolution-Unlicensed (LTE-Unlicensed), or mmWave communication. In some examples the media may be non-transitory or non-transient computer-readable media.

Example 112 may include a method performed by a machine type communication (MTC) relay device, the method comprising:
  receiving data from at least one MTC device;
  processing the data to produce processed data; and
  forwarding the processed data to an eNodeB (eNB), wherein at least one of:

the data is received via Device-to-Device (D2D) sidelink;
the MTC relay device is a relay node and the data is received via a relaying link; or
the MTC relay device is a multi-radio access technology (multi-RAT) capable small cell device and the data is received via WiFi, Bluetooth, Long-Term Evolution-Unlicensed (LTE-Unlicensed), or mmWave communication.

Example 113 may include the method of example 112, wherein the data is received via D2D sidelink and the method further comprises:
determining whether or not the data is successfully decoded, and either
(a) feeding-back acknowledgment/negative-acknowledgement (ACK/NACK) information to the MTC device based on the determination whether or not the data is successfully decoded, or
(b) feeding-back ACK/NACK information to the eNB based on the determination whether or not the data is successfully decoded.

Example 114 may include a method performed by a machine type communication (MTC) device, the method comprising:
producing a measurement report; and
transmitting the measurement report to an eNodeB (eNB) via an MTC relay device, wherein at least one of:
the measurement report is transmitted via Device-to-Device (D2D) sidelink;
the MTC relay device is a relay node and the measurement report is transmitted via a relaying link; or
the MTC relay device is a multi-radio access technology (multi-RAT) capable small cell device and the measurement report is transmitted via WiFi, Bluetooth, Long-Term Evolution-Unlicensed (LTE-Unlicensed), or mmWave communication.

Example 115 may include one or more computer-readable media comprising instructions to cause an electronic device, upon execution of the instructions by one or more processors to operate as a device according to any one of examples 91 to 108, or to perform the method of any one of examples 112 to 114. In some examples the media may be non-transitory or non-transient computer-readable media.

Example 116 may include an electronic communication relay device, the electronic device comprising:
means to receive data from at least one machine type communication (MTC) device; and
means to forward processed data, based on the data, to an evolved NodeB (eNB), wherein at least one of:
the data is received via Device-to-Device (D2D) sidelink;
the MTC relay device is a relay node and the data is received via a relaying link; or
the MTC relay device is a multi-radio access technology (multi-RAT) capable small cell device and the data is received via WiFi, Bluetooth, Long-Term Evolution-Unlicensed (LTE-Unlicensed), or mmWave communication.

Example 117 may include an electronic communication device, comprising:
means to produce data;
means to output the data for transmission to an eNodeB (eNB) via a machine type communication (MTC) relay device, wherein at least one of:
the data is to be transmitted via Device-to-Device (D2D) sidelink;
the MTC relay device is a relay node and the data is to be transmitted via a relaying link; or
the MTC relay device is a multi-radio access technology (multi-RAT) capable small cell device and the data is to be transmitted via WiFi, Bluetooth, Long-Term Evolution-Unlicensed (LTE-Unlicensed), or mmWave communication. The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

The invention claimed is:

1. An electronic device for use in a machine type communication (MTC) relay device, the electronic device comprising circuitry, the circuitry having:
a receive signal path to receive data from a plurality of MTC devices;
a transmit signal path to forward processed data, based on the data, to an evolved NodeB (eNB), wherein at least one of:
the data is received via Device-to-Device (D2D) sidelink;
the MTC relay device is a relay node and the data is received via a relaying link; or
the MTC relay device is a multi-radio access technology (multi-RAT) capable small cell device and the data is received via WiFi, Bluetooth, Long-Term Evolution-Unlicensed (LTE-Unlicensed), or mmWave communication; and
logic to:
send a resource request, via the transmit signal path, to the eNB, the resource request to include information regarding the plurality of MTC devices, wherein the information includes identity and capability information for individual MTC devices of the plurality of MTC devices;
collect, from the plurality of MTC devices, the data, which includes MTC measurement reports; and
forward, to the eNB, the processed data, which includes a consolidation of the measurement reports from the plurality of the MTC devices.

2. The electronic device of claim 1, further comprising logic to request, from the eNB, a D2D sidelink resource for transmission via the D2D sidelink of the data from the MTC device to the electronic device.

3. The electronic device of claim 1, wherein the resource request further includes a buffer status report (BSR) for each MTC measurement report.

4. The electronic device of claim 1, wherein the logic is to receive an indication of allocation of a logical periodic D2D resource pool from the eNB in response to the resource request; map the logical periodic D2D resource pool to periodic instances of a physical channel; and send an indication of the periodic instances of the physical channel to the plurality of MTC devices.

5. The electronic device of claim 1, wherein the logic is to attempt to decode a first MTC measurement report from a first MTC device; feedback negative-acknowledgement (NACK) information to the first MTC device based on the attempt to decode the first MTC measurement report being unsuccessful; successfully decode a retransmission of the first MTC measurement report; and include, within the processed data, information from the successful decoding of the retransmission of the first MTC measurement report.

6. The electronic device of claim 1, wherein the logic is to attempt to decode a first MTC measurement report from a first MTC device; include, within the processed data, negative-acknowledgement (NACK) information based on the attempt to decode the first MTC measurement report being unsuccessful.

7. The electronic device of claim 1, wherein the transmit signal path is to forward the processed data to the eNB via another D2D device by employing two-hop communication.

8. An MTC relay device comprising the electronic device of claim 1, and further comprising one or more of: a display, a camera, a sensor, an input/output (I/O) interface.

9. The electronic device of claim 4, wherein the indication of the periodic instances includes an indication of a subframe offset and a periodicity.

10. The electronic device of claim 4, wherein the indication of the periodic instances includes a subframe bitmap to provide an indication of subframes allocated for the MTC measurement reports.

11. An electronic device for use in a machine type communication (MTC) device, comprising:
    logic to produce data;
    circuitry to receive a downlink transmission from an eNB, the downlink transmission to include downlink control information (DCI) scrambled by MTC cell radio network temporary identifier (MTC-C-RNTI) that corresponds to a group of MTC devices, the DCI to include an indication of a resource allocation for transmitting data from the group of MTC devices to an MTC relay device; and
    circuitry to output the data in an MTC measurement report for transmission to an eNodeB (eNB) via the MTC relay device, wherein at least one of:
        the data is to be transmitted via Device-to-Device (D2D) sidelink;
        the MTC relay device is a relay node and the data is to be transmitted via a relaying link;
        or
        the MTC relay device is a multi-radio access technology (multi-RAT) capable small cell device and the data is to be transmitted via WiFi, Bluetooth, Long-Term Evolution-Unlicensed (LTE-Unlicensed), or mmWave communication.

12. The electronic device of claim 11, wherein the data is transmitted via D2D sidelink.

13. The electronic device of claim 11, wherein the logic is to receive acknowledgment/negative-acknowledgement (ACK/NACK) information from the eNB, depending on whether or not the data is successfully decoded by the MTC relay device.

14. An MTC device comprising the electronic device of claim 11, and further comprising a sensor to provide sensor information to the logic, the logic to process the sensor information to produce the data.

15. One or more non-transitory computer-readable media comprising instructions to cause an electronic device, upon execution of the instructions by one or more processors of the electronic device, to:
    send a resource request to an eNB, the resource request to include identity and capability information for individual machine-type communication (MTC) devices of a plurality of MTC devices;
    collect, from the plurality of MTC devices over device-to-device sidelinks, MTC measurement reports; and
    forward, to the eNB, a consolidation of the measurement reports from the plurality of the MTC devices.

16. The media of claim 15, wherein the instructions, when executed, further to cause the electronic device to:
    attempt to decode a first MTC measurement report from a first MTC device;
    feedback negative-acknowledgement (NACK) information to the first MTC device based on the attempt to decode the first MTC measurement report being unsuccessful;
    successfully decode a retransmission of the first MTC measurement report; and
    include, within processed data, information from the successful decoding of the retransmission of the first MTC measurement report.

17. The media of claim 15, wherein the instructions, when executed, further cause the device to: receive an indication of allocation of a logical periodic D2D resource pool from the eNB in response to the resource request; map the logical periodic D2D resource pool to periodic instances of a physical channel; and send an indication of the periodic instances of the physical channel to the plurality of MTC devices.

18. The media of claim 15, wherein the instructions, when executed, further cause the device to: include, within the processed data, negative-acknowledgement (NACK) information based on the attempt to decode the first MTC measurement report being unsuccessful.

* * * * *